(12) United States Patent
Hamanaka

(10) Patent No.: US 8,964,855 B2
(45) Date of Patent: Feb. 24, 2015

(54) DATA TRANSMISSION APPARATUS, DATA TRANSMISSION METHOD, AND PROGRAM

(75) Inventor: Akiyoshi Hamanaka, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 384 days.

(21) Appl. No.: 12/463,420

(22) Filed: May 10, 2009

(65) Prior Publication Data

US 2009/0279616 A1 Nov. 12, 2009

(30) Foreign Application Priority Data

May 12, 2008 (JP) .................. 2008-125132

(51) Int. Cl.
| | | |
|---|---|---|
| H04L 1/08 | (2006.01) | |
| H04N 19/166 | (2014.01) | |
| H04L 1/18 | (2006.01) | |
| H04N 21/2383 | (2011.01) | |
| H04N 21/4425 | (2011.01) | |
| H04N 21/6375 | (2011.01) | |
| H04N 21/6377 | (2011.01) | |
| H04N 21/658 | (2011.01) | |
| H04N 19/89 | (2014.01) | |
| H04N 19/107 | (2014.01) | |
| H04N 19/172 | (2014.01) | |
| H04N 19/61 | (2014.01) | |

(52) U.S. Cl.
CPC ........ *H04N 19/00242* (2013.01); *H04L 1/1809* (2013.01); *H04N 21/2383* (2013.01); *H04N 21/4425* (2013.01); *H04N 21/6375* (2013.01); *H04N 21/6377* (2013.01); *H04N 21/658* (2013.01); *H04N 19/00933* (2013.01); *H04N 19/0003* (2013.01); *H04N 19/00266* (2013.01); *H04N 19/00781* (2013.01)
USPC .................................................. 375/240.27

(58) Field of Classification Search
CPC .................. H04N 19/00939; H04N 19/00933; H04L 1/1809
See application file for complete search history.

(56) References Cited

U.S. PATENT DOCUMENTS

| 6,233,283 | B1 * | 5/2001 | Chiu et al. | 375/240.27 |
| 6,732,313 | B2 * | 5/2004 | Fukushima et al. | 714/748 |
| 7,480,333 | B2 * | 1/2009 | Rault | 375/240.12 |
| 2005/0089232 | A1 * | 4/2005 | Hsu et al. | 382/236 |
| 2007/0116126 | A1 * | 5/2007 | Haskell et al. | 375/240.21 |
| 2008/0176517 | A1 * | 7/2008 | Lee et al. | 455/63.1 |

FOREIGN PATENT DOCUMENTS

| JP | 2003-23639 A | 1/2003 |
| JP | 2007-288604 A | 11/2007 |

* cited by examiner

*Primary Examiner* — Joseph Ustaris
*Assistant Examiner* — Mikhail Itskovich
(74) *Attorney, Agent, or Firm* — Canon U.S.A., Inc. IP Division

(57) ABSTRACT

A transmission apparatus receives information used to identify video data in which an error occurs on a communication path, and changes a coding mode in which data coding is performed by referring to video data in other frame so that video data coded by referring to the video data corresponding to the identification information is coded in a coding mode in which data coding is performed without referring to the video data in the other frame. Further, the transmission apparatus codes video data in the changed coding mode.

13 Claims, 9 Drawing Sheets

FIG. 7

|  | CONTENT 1 | | |
| --- | --- | --- | --- |
| FILE NO. | CODING BITRATE | CODING PATTERN | |
| 1 | 500 kbps | M = 3, N = 15 | IBBPBBPBBPBBPBBI |
| 2 | 1 Mbps | M = 3, N = 15 | |
| 3 | 3 Mbps | M = 3, N = 15 | |
| 4 | 6 Mbps | M = 3, N = 15 | |
| 5 | 9 Mbps | M = 3, N = 15 | |
| 6 | 12 Mbps | ALL INTRA | IIIII···I |
| 7 | 16 Mbps | ALL INTRA | IIIII···I |

DATA TRANSMISSION APPARATUS, DATA TRANSMISSION METHOD, AND PROGRAM

BACKGROUND OF THE INVENTION

1. Field of the Invention

The present invention relates to a data transmission apparatus, a data transmission method, and a program, and particularly relates to a data transmission technology relating to coded video contents.

2. Description of the Related Art

In the past, the method of forcibly changing a coding mode (coding method) to an intra-coding mode (intra-image coding mode) based on error information transmitted from the reception side for transmitting and/or receiving data relating to coded video contents has been proposed.

The above-described method has been used to decrease the number of frames through which an error propagates. The processing of the method is performed as below (refer to Japanese Patent Laid-Open No. 2003-23639, for example). When data that had not been appropriately received on the reception side (including data that is lost halfway through the transfer and that does not reach the reception side) is detected, an apparatus provided on the reception side transmits information determining the unreceived data (error information) to an apparatus provided on the transmission side (feedback). Upon receiving the error information transmitted from the apparatus provided on the reception side, the apparatus provided on the transmission side forcibly changes the coding mode of the next frame for coding to the intra-coding mode and performs data coding. Here, when the next frame for transmission had already been coded and the coding mode of the frame is not the intra-coding mode, the frame is decoded and the coding mode is changed to the intra-coding mode, and data recoding is performed.

Further, for transmitting and/or receiving data relating to coded video contents, the code amount is often controlled on the reception side, so as to reproduce the data at a desired frame rate. According to the above-described code amount control, frame rate information relating to a frame rate at which data is actually reproduced on the reception side is transmitted to the transmission side. Upon receiving the frame rate information, the amount of generated code is appropriately adjusted on the reception side based on the frame rate information.

However, in the above-described known method, the coding mode of the next frame for coding is forcibly changed to the intra-coding mode based on the error information when an error occurs. Although the error propagation can be stopped through the above-described method, the code amount is abruptly increased. In that case, the communication line is tightened, which may increase delayed transfers and data losses.

Further, when the communication path capacity (bandwidth) is limited and the coding mode is forcibly changed to the intra-coding mode, the code amount is abruptly increased. Therefore, the code amount that should be distributed to the frames from then on is decreased, which may significantly degrade the image quality. Further, the current bandwidth is estimated on the reception side based on the actual frame rate information. Therefore, when the transmission bit rate control is achieved by increasing and/or decreasing the frame rate, it has been difficult to delicately control the code amount in frames.

SUMMARY OF THE INVENTION

The present invention allows for decreasing the number of frames through which an error propagates without significantly changing the code amount when an error occurs during the transmission and/or the reception of data relating to video contents.

According to an aspect of the present invention, a transmission apparatus configured to code and transmit video data is provided, where the transmission apparatus includes a receiving unit configured to receive information used to identify video data in which an error occurs on a communication path, a changing unit configured to change a coding mode in which data coding is performed by referring to video data in other frame so that video data coded by referring to the video data corresponding to the identification information is coded in a coding mode in which data coding is performed without referring to the video data in the other frame, and a coding unit configured to code video data in accordance with the coding-mode change made by the changing unit.

Further features of the present invention will become apparent from the following description of exemplary embodiments with reference to the attached drawings.

BRIEF DESCRIPTION OF THE DRAWINGS

FIG. 7 illustrates the configuration of file data stored in a storage unit according to an embodiment of the present invention.

DESCRIPTION OF THE EMBODIMENTS

Here, embodiments of the present invention will be described with reference to the attached drawings.

Figure 1:
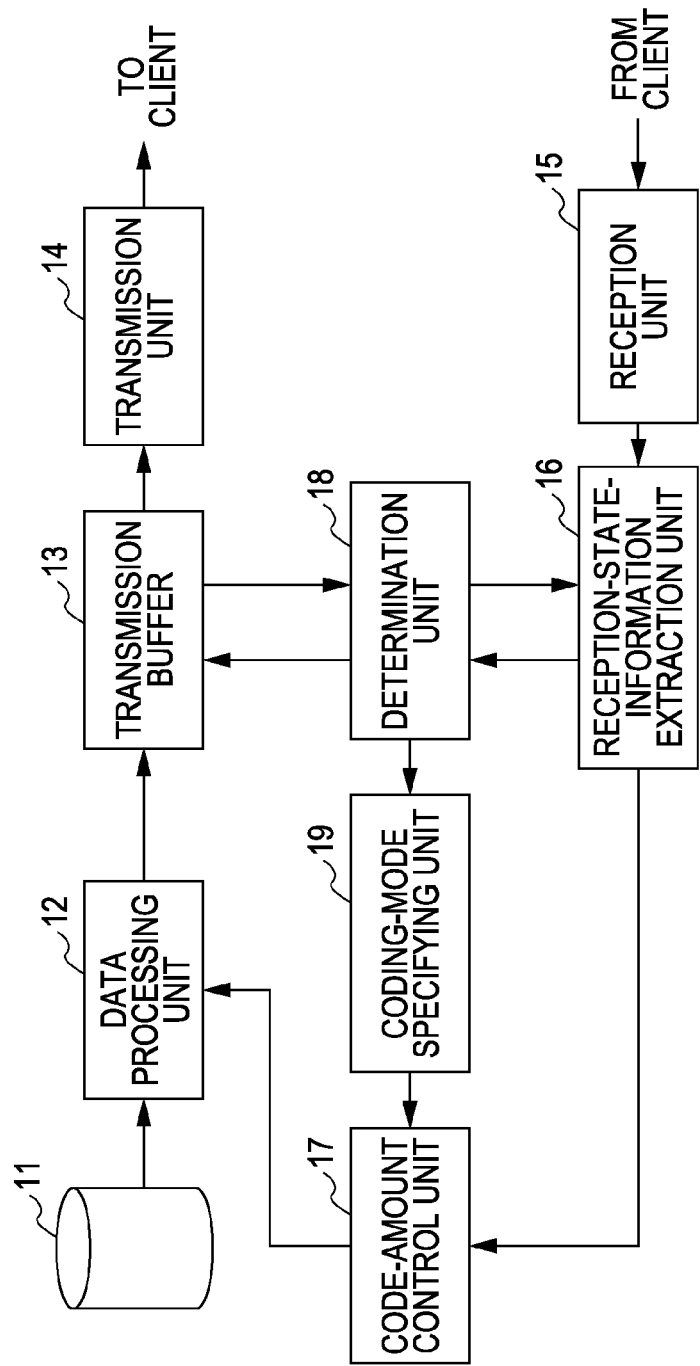
FIG. 1 is a diagram showing an exemplary configuration of a transmission apparatus according to an embodiment of the present invention.
Figure 2:
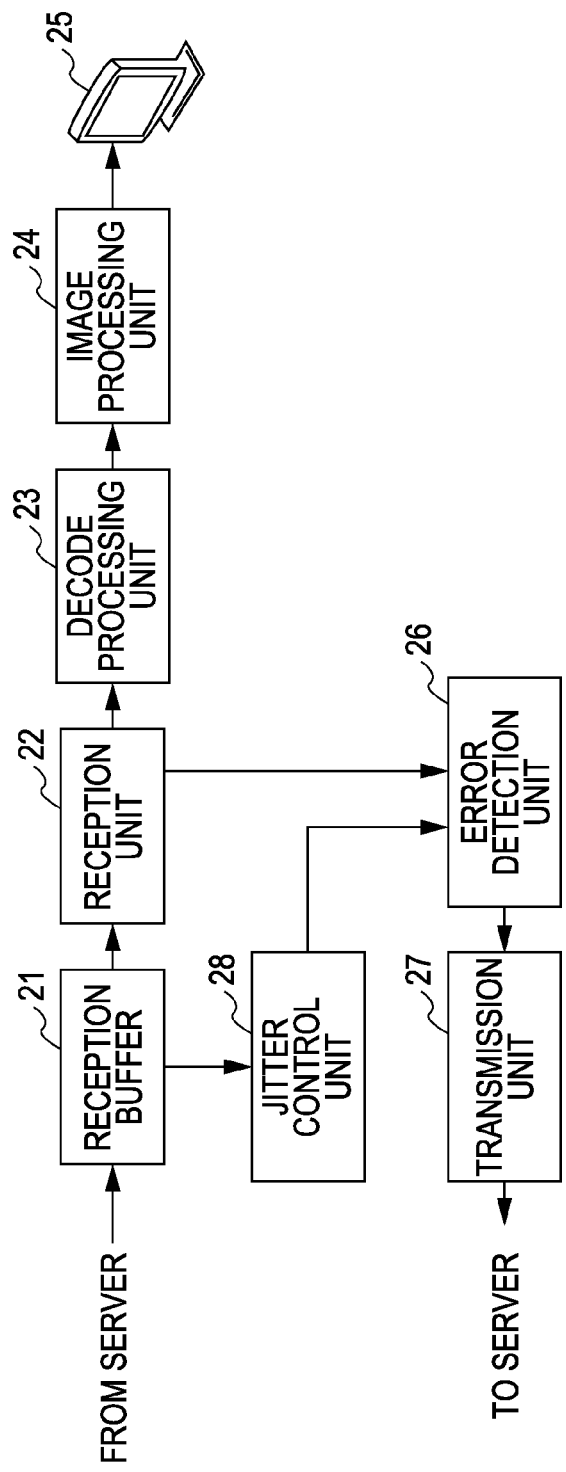
FIG. 2 is a diagram showing an exemplary configuration of a reception apparatus according to an embodiment of the present invention.

FIG. 1 is a block diagram showing an exemplary configuration of a transmission apparatus according to an embodiment of the present invention and FIG. 2 is a block diagram showing an exemplary configuration of a reception apparatus according to another embodiment of the present invention.

In FIG. 1, a storage unit 11, a data processing unit 12, a transmission buffer 13, a transmission unit 14, a reception unit 15, a reception-state-information extraction unit 16, a code-amount control unit 17, a determination unit 18, and a coding-mode specifying unit 19 are provided. Further, in FIG. 2, a reception buffer 21, a reception unit 15, a decode processing unit 23, an image processing unit 24, a display unit 25, an error detection unit 26, a transmission unit 27, and a jitter control unit 28 are shown.

The storage unit 11 stores data relating to video contents. The data processing unit 12 reads the above-described data from the storage unit 11 and codes the read data based on coding mode. The coding mode includes intra-coding mode (intra-image coding mode), forward-directional prediction coding mode, and bidirectional prediction coding mode. Further, the data processing unit 12 packetizes the coded data in a predetermined packet format.

The coded data packetized through the data processing unit 12 is transmitted to the transmission unit 14 via the transmission buffer 13. The transmission unit 14 repacketizes the transmitted packet (coded data) under an arbitrary protocol, and transmits the packet to the reception apparatus (client) shown in FIG. 2 via an arbitrary communication path.

The packet transmitted to the reception apparatus is temporarily accumulated in the reception buffer 21. Then, the packet is read under the control of the reception unit 22 and subjected to error detection processing performed by the error detection unit 26. If a result of the error detection processing performed by the error detection unit 26 shows that there is no error, the read packet is transmitted to the decode processing unit 23 and subjected to decode processing. Further, after being subjected to arbitrary image processing through the image processing unit 24, data of the packet is displayed on the display unit 25.

On the other hand, if an error and/or the packet loss is detected through the error detection unit 26, the error detection unit 26 determines the error and/or the lost packet based on packets that are appropriately transmitted before and after the error and/or the lost packet. Hereinafter, "the error and/or the lost packet" will be referred to as "the error packet". For example, the sequence number and the frame number of the error packet is estimated by referring to information indicating the sequence numbers of the packets that are appropriately transmitted before and after the error packet, the frame number of a frame to which the coded data included in the packet belongs, and so forth. In the above-described embodiment, the sequence number and the frame number are determined to be parameters used to determine the error packet. That is to say, the sequence number and the frame number are determined to be the parameter of reception-state information.

The jitter control unit 28 calculates the average value of the reception intervals and the variation range of the reception intervals within an arbitrary determined time period by monitoring the packet reception intervals. The transmission unit 27 transmits the reception state information (error information) to the transmission apparatus (server) shown in FIG. 1. The reception state information (error information) includes information about the parameter (the sequence number and the frame number) used to determine the error packet of which data is obtained through the error detection unit 26. Further, the reception state information (error information) includes information about the average value and/or the variation range of the reception intervals, which are calculated through the jitter control unit 28, as occasion arises.

The reception state information transmitted from the reception apparatus is transmitted to the reception unit 15 of the transmission apparatus, and further transmitted to the reception-state-information extraction unit 16.

The reception-state-information extraction unit 16 divides the reception state information into information items indicating the parameters. Of the parameter information items divided by the reception-state-information extraction unit 16, the information item indicating the sequence number and the frame number of the error packet is transmitted to the determination unit 18. Further, of the parameters divided by the reception-state-information extraction unit 16, jitter information relating to the time variations of jitters relating to the reception packet (the average value and/or the variation range of the reception intervals) is transmitted to the code-amount control unit 17.

When the determination unit 18 determines that an error occurs in the transmitted packet based on the reception state information (error information), the determination unit 18 determines whether processing for the error packet should be performed. More specifically, the determination unit 18 calculates the distance (the number of frames) R from the next frame for transmission to the next frame for intra-image coding in the order in which coding is performed and/or the order in which data transmission is performed. Then, the determination unit 18 compares the calculated value R with an arbitrary determined threshold value THR. When the comparison result shows that the expression R<THR holds (the number of the frames is smaller than the threshold value), the determination unit 18 determines that the processing for the error packet should not be performed. On the other hand, when the comparison result shows that the expression R≥THR holds (the number of the frames is equal to the threshold value THR or more), the determination unit 18 calculates and determines the range of the impact of the coded data included in the error packet on a frame.

Further, the determination unit 18 determines whether the packet corresponding to the sequence number of a transmitted error packet (a packet that had already been transmitted) is left in the transmission buffer 13. If it is determined that the packet is left in the transmission buffer 13, the determination unit 18 makes a determination for and against retransmission. Consequently, when the same packet as the error packet is retransmitted to the reception apparatus, it becomes possible to determine whether the retransmitted packet is handled as effective data in the reception apparatus. The above-described determination for and against the retransmission is made as below, for example. The determination unit 18 measures the time taken for transmitting data between the transmission apparatus and the reception apparatus, that is, a so-called round trip time so as to estimate the time when retransmitted data reaches the reception apparatus. The estimated time is compared with the time when decoding processing for coded data included in the error packet is started (decoding time stamp (DTS)), the time when the display of decoded data is started (presentation time stamp (PTS)), and so forth. It is determined whether the retransmitted packet reaches the reception apparatus before the DTS and/or the PTS based on the comparison result. The above-described determination method has been described as an exemplary method and the present invention may be achieved without being limited to the above-described method.

If the determination unit 18 determines that the retransmitted data is handled by the reception apparatus as the effective data, the same packet as the error packet indicated by the reception state information is read from the transmission buffer 13 and transmitted from the transmission unit 14 to the reception apparatus. On the other hand, if the determination unit 18 determines that the retransmitted data becomes invalid in the reception apparatus, information about the determination result and information used to specify the coded data included in the error packet (information specifying an area defined on a frame, the area being affected by the error packet) is transmitted to the coding-mode specifying unit 19.

Upon receiving the determination result information and the coded-data specifying information, the coding-mode specifying unit 19 transmits information specifying an area adjacent to the coded data included in the error packet and the coding-mode specifying information (the intra-image coding mode in the above-described embodiment) to the code-amount control unit 17.

The code-amount control unit 17 controls coding mode in which data is read from the storage unit 11 and coded for the data processing unit 12. More specifically, for an area specified by the coding-mode specifying unit 19 (an area affected by the error packet), the code-amount control unit 17 forcibly switches from a predetermined coding mode to intra coding mode for data coding. Further, the code-amount control unit 17 performs control so that data is coded in the predetermined coding mode in any area other than the above-described area. Further, the above-described processing performed to forcibly change the coding mode of the partial area relating to the error packet and the area adjacent thereto to the intra coding mode and code the data of the partial area and the adjacent area is continued to the frame immediately preceding the next intra-coding frame (intra-image coding frame).

Hereinafter, the method of recovering from an error and reducing the error propagation according to a first embodiment of the present invention will be described with reference to FIGS. 3, 4, 5, and 6.

Figure 5:
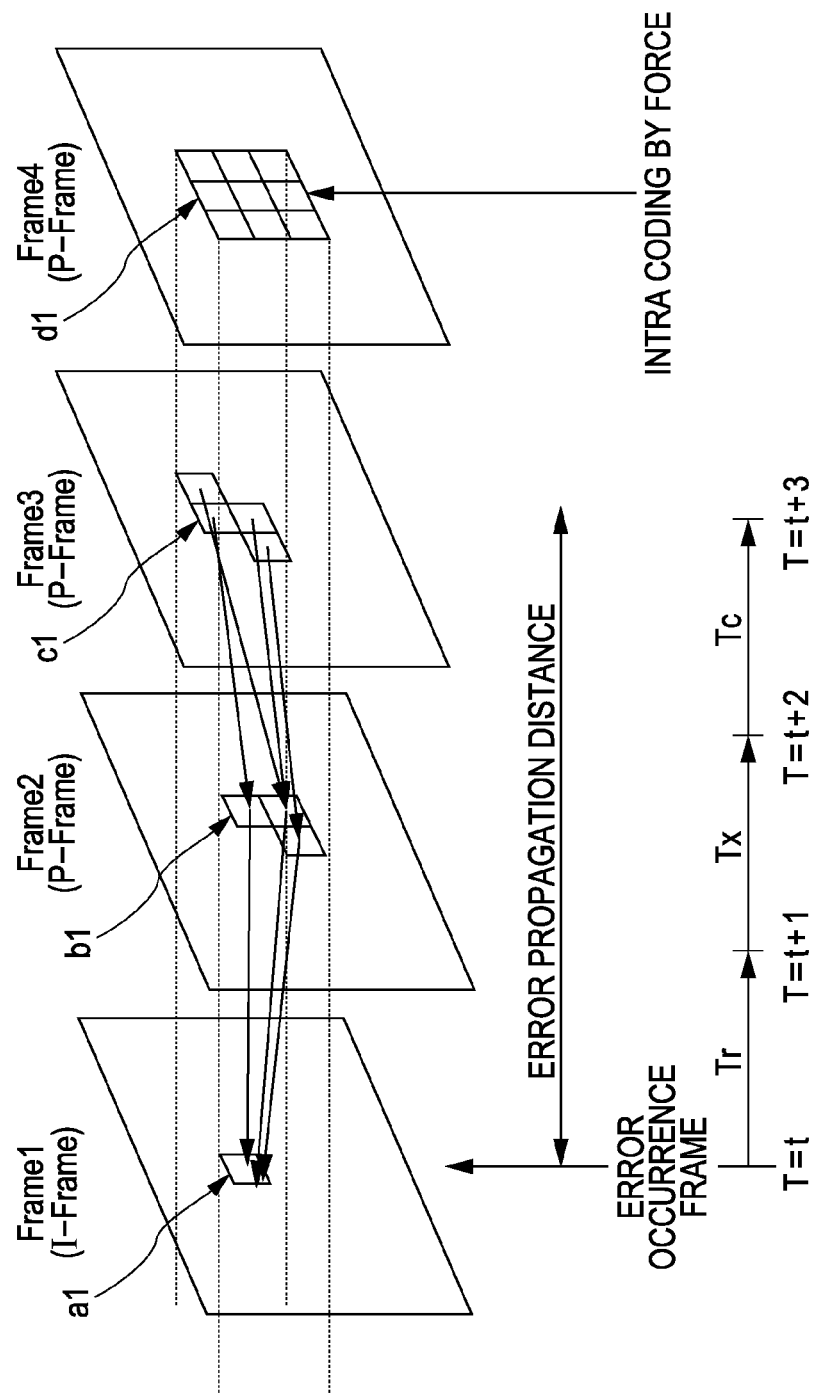
FIG. 5 is a diagram showing exemplary coding processing performed according to an embodiment of the present invention.
Figure 6:
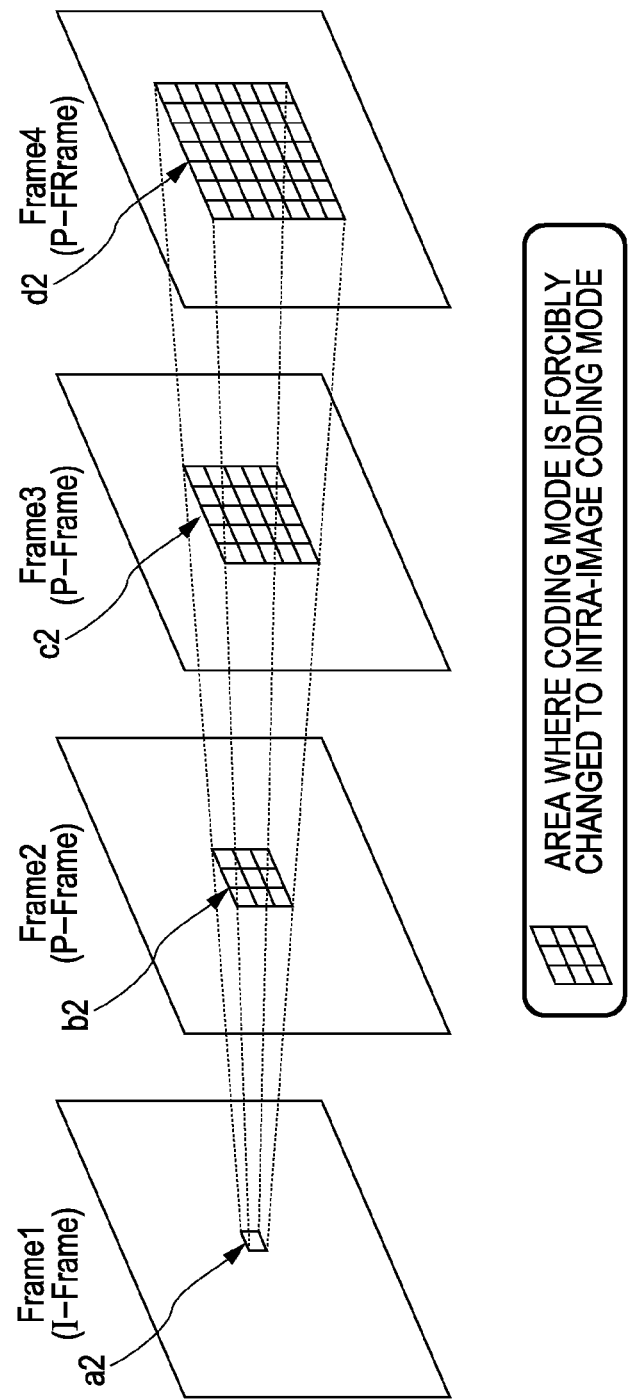
FIG. 6 is a diagram showing different exemplary coding processing performed according to an embodiment of the present invention.

When an arbitrary packet is lost on the communication path and/or received as an undecodable packet due the error occurrence while packets including data relating to coded video contents are transferred, as shown in FIG. 5, it is difficult to decode coded data included in the error packet. In that case, therefore, the image of a frame displayed immediately before is displayed as it is, or an inappropriate image (including a darkened error area, a whitish error area, and so forth) is shown in most instances.

In FIG. 5, the sign "Frame 1" indicates an intra-image coding frame (I-Frame) in which data is coded in the intra-image coding mode. Further, each of the signs "Frame 2", "Frame 3", and "Frame 4" indicates a forward-directional prediction encoding frame in which data is coded in the forward-directional prediction coding mode. Further, a partial area a1 of the intra-image coding frame Frame 1 (hereinafter referred to as the Frame 1) is determined to be the error area. Namely, the first embodiment will be described on the assumption that an error occurs in a packet including the coded data generating the Frame 1 shown in FIG. 5 and the image of the partial area a1 of the frame corresponding to the error packet is disturbed.

In the next frame (the Frame 2 shown in FIG. 5), the partial area a1 is used as a reference image for an area b1. In the Frame 2, therefore, the area of the disturbed image is enlarged to the area b1. Similarly, in the Frame 3 shown in FIG. 5, the disturbed image area is enlarged to an area c1, where the area b1 of the Frame 2 is used as a reference image for the area c1.

Hereinafter, the first embodiment will be described on the assumption that a packet including coded data of the area a1 is transmitted from the transmission side at time T=t, and the above-described packet is received on the reception side at time T=t+1. Since the error occurs in the above-described packet on the communication path, the packet is abandoned on the reception side. At the same time, reception state information (error information) including information used to determine the error packet is transmitted from the reception side to the transmission side at time T=t+2.

Figure 3:
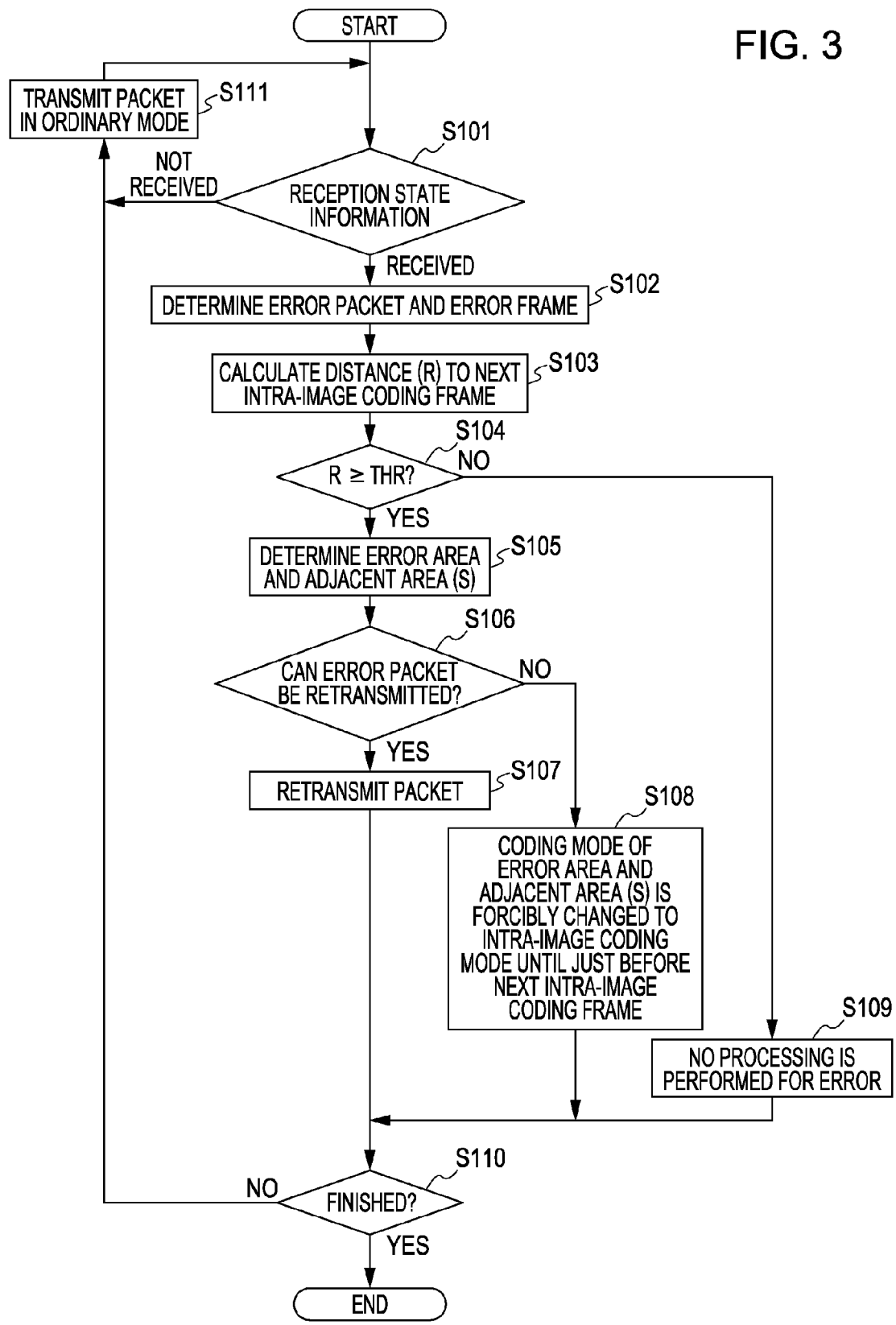
FIG. 3 is a flowchart showing exemplary operations of a transmission apparatus according to an embodiment of the present invention.

The reception state information transmitted from the reception side to the transmission side at time T=t+2 is received on the transmission side at time T=t+3 (indicated by the sign "Received" shown at step S101 shown in FIG. 3). Consequently, on the transmission side, it is detected that an error occurs in the packet including the coded data of the area a1 of the Frame 1 shown in FIG. 5 and the coded data is not appropriately decoded on the reception side.

Next, the reception-state-information extraction unit 16 extracts data of the parameter determining the error packet (the sequence number and the frame number) from the received reception state information. Consequently, a frame to which the error packet and the coded data included in the error packet belong is determined at step S102.

Next, the determination unit 18 calculates the distance R from the determined frame to the next intra-image coding frame in the order in which coding is performed and/or the order in which data transmission is performed based on the parameter determining the error packet, the parameter being transmitted from the reception-state-information extraction unit 16, at step S103. Then, the determination unit 18 compares the calculated distance R with the arbitrarily defined threshold value THR, and determines whether the processing for the error packet should be performed at step S104.

If the comparison result obtained at step S104 shows that the value of the distance R is smaller than the threshold value THR (R<THR), the determination unit 18 determines that the processing for the error packet should not be performed. Therefore, the processing for the error packet is not performed at step S109. On the other hand, when the comparison result shows that the value of the distance R is equal to the threshold value THR or more (R≥THR), the determination unit 18 calculates and determines the ranges of the impact of the coded data included in the error packet on the frame (the area a1 and the area adjacent thereto that are shown in FIG. 5) at step S105.

Next, the determination unit 18 determines whether the error packet (a transmitted packet with an error and/or a lost transmitted packet) can be retransmitted at step S106. More specifically, the determination unit determines whether the packet corresponding to the sequence number of the error packet is left in the transmission buffer 13. Further, the determination unit 18 determines whether the retransmitted packet is handled as data which is effective in terms of time on the reception side if the same packet as the error packet is retransmitted. The determination whether the retransmitted packet is handled as the effective data is made by adding the value of the current time to that of a predicted time taken for transmission and comparing the value of the addition result with that of the time when processing for the coded data included in the packet corresponding to the error packet is started on the reception side. If the value of the addition of the current time to the predicted time taken for the transmission corresponds to a time before the time when the processing is started on the reception time, it is determined that the error packet can be retransmitted. If the value of the addition corresponds to a time after the time when the processing is started on the reception time, it is determined that it is difficult to retransmit the error packet. If a packet for retransmission does not exist in the transmission buffer 13, it is automatically determined that it is difficult to perform the data retransmission. The above-described determination method has been described as an exemplary method and the present invention may be achieved without being limited to the above-described method.

If the result of the determination made at step S106 shows that the same packet as the error packet can be retransmitted, the same packet as the error packet is read from the transmission buffer 13 and retransmitted from the transmission unit 14 at step S107.

On the other hand, if the result of the determination made at step S106 shows that it is difficult to retransmit the same packet as the error packet, the following processing is performed. The coding mode is forcibly changed to the intra-image coding mode for each of frames existing in the time period between the next frame for coding and/or transmission and the appearance of the next intra-image coding frame irrespective of the coding mode of an error frame, and the data coding is performed at step S108. The forcible coding-mode change is performed only for an entirely coded block existing in a predetermined error area and an arbitrary area adjacent to the error area (a macro block and/or a slice).

After the above-described processing procedures are performed, it is determined whether the transmission of the data relating to the video contents is finished at step S110. If the determination result shows that the transmission is finished, operations are finished. Otherwise, the next packet is transmitted at step S111 and the above-describe processing procedures are performed again.

In FIG. 5, the forcible change to the intra-image coding mode is made for the Frame 1 including the error packet. As a result, the Frame 4 is obtained. In the Frame 4, the coding mode is forcibly changed to the intra-image coding mode only for an area d1 and data coding is performed.

According to the above-described embodiment, the coding mode is exemplarily changed to the intra-image coding mode for the error area and the area adjacent thereto in the Frame 4 as shown in FIG. 5 so that the error area and the area adjacent thereto of the Frame 3 do not function as reference areas for the error area and the area adjacent thereto of the Frame 4. Therefore, the error propagation is stopped at the Frame 3 so that the error does not propagate to the Frame 4 or later. Further, the coding mode is not changed to the intra-image coding mode for the entire frame, but changed only for the error area and the area adjacent thereto for the data coding. Therefore, it becomes possible to prevent the code amount from being increased and the code amount from being varied significantly.

Figure 4:
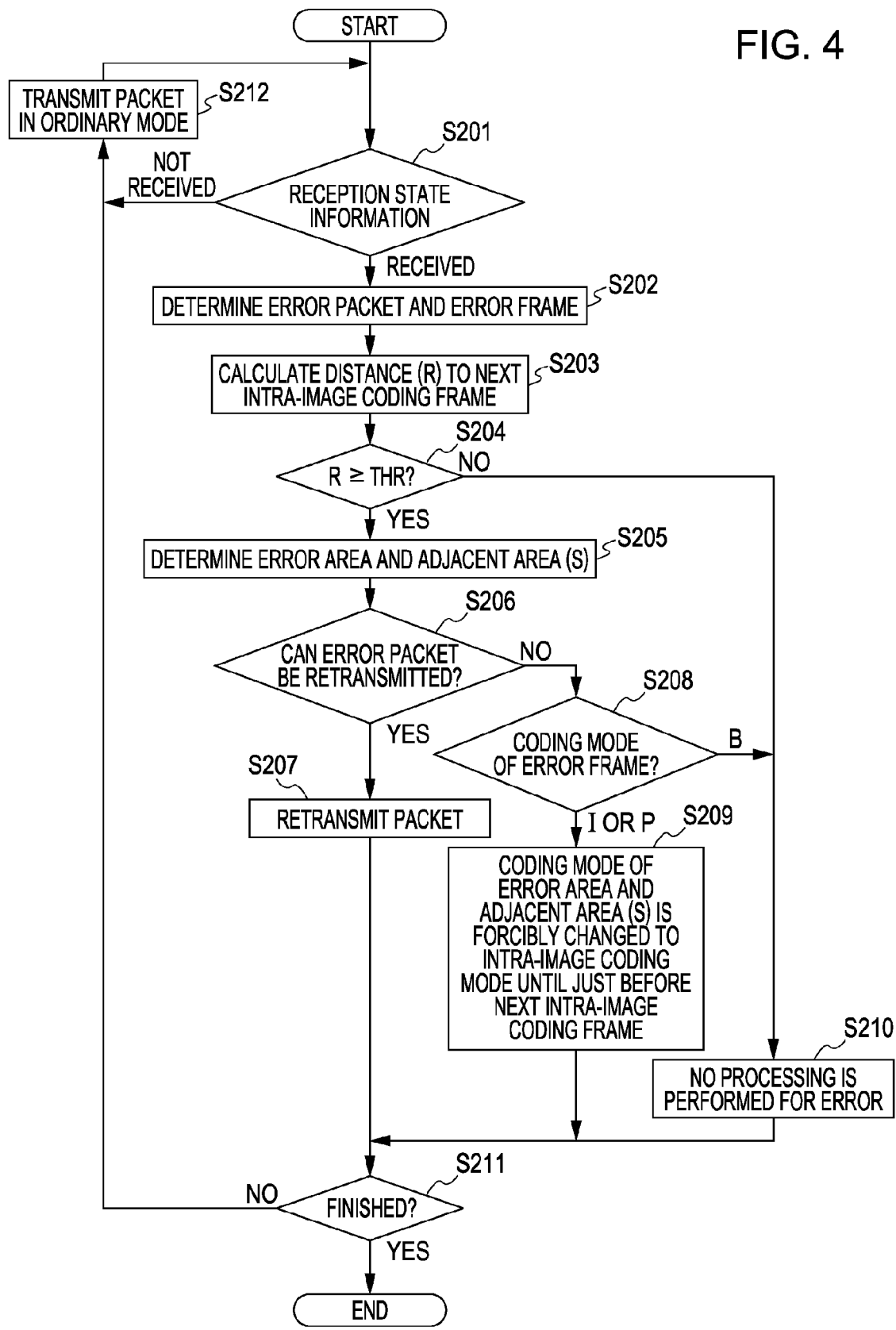
FIG. 4 is a flowchart showing different exemplary operations of the transmission apparatus.

Further, as shown in FIG. 4, the determination unit 18 and/or the coding-mode specifying unit 19 may determine the coding mode of a frame to which the coded data included in the error packet belongs before the coding mode is forcibly changed to the intra-image coding mode at step S208. In that case, it becomes possible to perform appropriate processing based on a frame to which the coded data included in the error packet belongs.

Namely, if the result of the determination made at step S208 shows that the coding mode of the frame to which the coded data included in the error packet belongs is the bidirectional prediction coding mode (B frame), the frame itself does not function as a frame being referred to. Therefore, the processing for the error packet is not performed at step S210. On the other hand, if the coding mode of the frame to which the coded data included in the error packet belongs is determined to be the intra-image coding mode (I frame) and/or the forward-directional prediction coding mode (P frame), the same processing as that performed at step S108 shown in FIG. 1 is performed.

Since the processing procedures relating to steps S201 to S207 and S209 to S212 that are shown in FIG. 4 are equivalent to those performed at steps S101 to S107 and S108 to S111 that are shown in FIG. 3, the descriptions thereof are omitted.

The arbitrary area adjacent to the error area is not limited in the present invention. For example, if the code amount is limited and/or an increase in the code amount should be minimized, the coding mode may be forcibly changed to the intra-image coding mode only for the error area and the area which is directly adjacent thereto. Further, if the code amount may be increased, areas a2, b2, c2, and d2 for which the coding mode is forcibly changed to the intra-image coding mode may be enlarged based on the distance (the number of frames) from the Frame 1 where the error occurs as exemplarily shown in FIG. 6.

Next, a second embodiment of the present invention will be described. The first embodiment is described on the assumption that the data relating to the video contents is coded in real time. On the other hand, in the second embodiment, at least two file-data items coded at coding bit rates different from one another are provided for each content, where the file-data items include file data in which the coding mode of each frame is the intra-image coding mode. Consequently, the file data in which the coding mode is the intra-image coding mode is used for areas affected by the error packet (an area relating to the error packet and the area adjacent thereto), which allows for decreasing the number of frames through which an error propagates without varying the code amount significantly.

Since the configurations of a transmission apparatus and a reception apparatus according to the second embodiment are the same as those of the transmission apparatus and the reception apparatus according to the first embodiment, the descriptions thereof are omitted. However, the storage unit 11 of the transmission apparatus of the second embodiment stores file-data items coded at various types of coding bit rates for a single video content. Further, the data processing unit 12 can search for and read data in predetermined unit (in blocks, macro blocks, slices, and frames, for example) from the storage unit 11 at any time under the control of the code-amount control unit 17. Here, since data that had already been coded is stored in the storage unit 11 in the second embodiment, the data processing unit 12 may not have a function of performing the coding processing.

In the following description, the storage unit 11 of the transmission apparatus stores file data coded at seven types of coding bit rates for a content 1 shown in FIG. 7. According to the content 1, the coding mode of each of file data items 1, 2, 3, 4, and 5 is the intra-image coding mode. In the intra-image coding mode, each of the file data items 1 to 5 is coded in the coding pattern where the frame cycle is indicated by the equation N=15, and the cycle of the forward-directional prediction coding frame and/or the intra-image coding frame is indicated by the equation M=3. Further, according to each of file data items 6 and 7, each frame is coded in the intra-image coding mode (the equations M=1 and N=1 hold). The file data items 1 to 5, and 6 and 7 are coded at different coding bit rates (the amount of codes generated in the unit time) by using the same coding format for the same content.

Operations of the transmission apparatus and the reception apparatus according to the second embodiment will be described. The above-described operations are performed on the assumption that the file data item 3 of the content 1 is read from the storage unit 11 in the coding order and transmitted to the data processing unit 12. The coded data transmitted to the data processing unit 12 is packetized in a predetermined packet format and transmitted to the transmission unit 14 via the transmission buffer 13. The packet transmitted to the transmission unit 14 is transmitted to the reception apparatus (client) via an arbitrary communication path.

Figure 8:
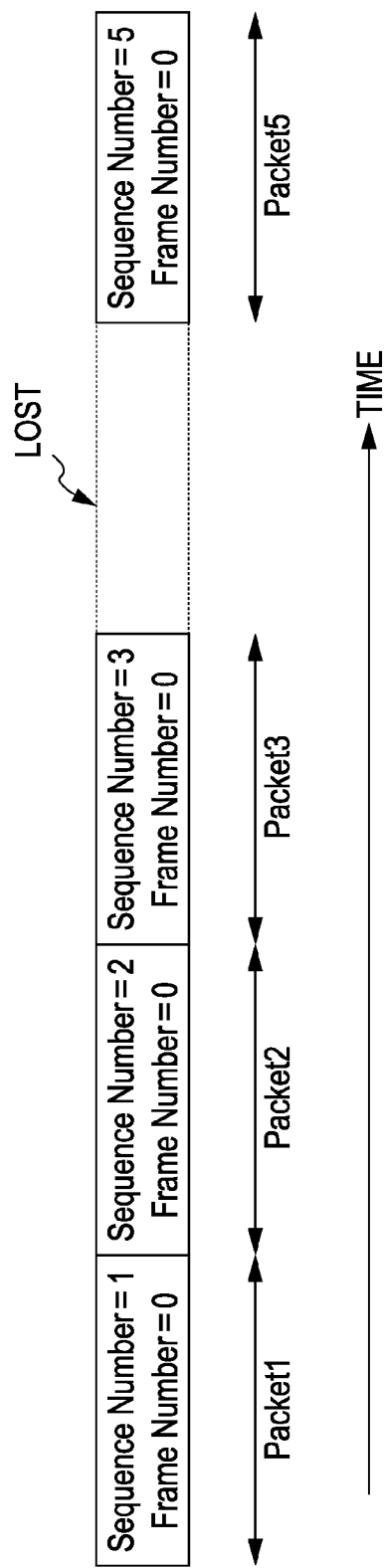
FIG. 8 illustrates operations performed according to an embodiment of the present invention.

Hereinafter, the operations will be described on the assumption that the reception apparatus receives packets 1, 2, 3, and 5 in that order as shown in FIG. 8, and the fourth packet (the sequence number 4) is not received (lost on the communication path for some reasons).

The packet received by the reception apparatus is temporarily accumulated in the reception buffer 21, and read under the control of the reception unit 22 and subjected to error-detection processing through the error detection unit 26. If the result of the error-detection processing shows that there is no error, the packet is subjected to decode processing performed by the decode processing unit 23 and arbitrary image processing performed by the image processing unit 24. After that, data of the packet is displayed on the display unit 25. On the other hand, if an error and/or the packet loss is detected (the fourth packet is lost in the above-described embodiment as shown in FIG. 8), an error packet is determined as is the case with the first embodiment based on packets that are appropriately received before and after the error packet.

Then, the reception state information including the parameters determining the error packet, the parameters being obtained through the error detection unit 26, and the average value and/or the variation range of the reception intervals calculated through the jitter control unit 28 are transmitted from the transmission unit 27 to the transmission apparatus (server).

The reception state information transmitted from the reception apparatus is received by the reception unit 15 of the transmission apparatus, and transmitted to the reception-state-information extraction unit 16. Further, the reception state information is divided into the parameters generating the reception state information. Of the divided parameters, information about the sequence number and the frame number of the error packet is transmitted to the determination unit 18. Jitter information relating to the time variations of the jitters relating to the received packet (the average value and the variation range) is transmitted to the code-amount control unit 17.

When it is determined that an error occurs in the transmitted packet based on the reception state information, the determination unit 18 makes various types of determinations as is the case with the first embodiment based on information about the sequence number and the frame number of the error packet, the information being extracted through the reception-state-information extraction unit 16. Namely, the determination unit 18 determines whether the same packet as the error packet is left in the transmission buffer, or whether the packet is handled as the effective data in the reception apparatus when the packet is retransmitted to the reception apparatus.

If the result of the determination made by the determination unit 18 shows that the retransmitted packet becomes invalid in the reception apparatus, information about the determination result and information determining the coded data included in the error packet are transmitted to the coding-mode specifying unit 19.

Upon receiving the determination-result information and the information determining the coded data, the coding-mode specifying unit 19 transmits information specifying an area adjacent to the coded data included in the error packet and coding-mode specifying information (the intra-image coding mode in that case) to the code-amount control unit 17.

The following description will be given on the assumption that the content 1 and the file data item 3 that are shown in FIG. 7 are currently streamed. At that time, the code-amount control unit 17 issues a command for the data processing unit 12 so that the file data items 6 and 7 in which the entire frame is coded in the intra-image coding mode are specified only for an area specified by the coding-mode specifying unit 19, and data is read from the file data item 3 in any area other than the above-described specified area. The processing performed to replace the error area and the area adjacent thereto with the intra-image coded data is continued until a frame immediately preceding the next intra-image coding frame comes along.

If there is a plurality of file data items in which the entire frame is coded in the intra-image coding mode as is the case with the above-described embodiment, the file selection can be appropriately made in view of the circumstances such as the bit rate and/or the image quality of a currently streamed file data item. In the above-described embodiment, the bit rate of the currently streamed file data item is 3 Mbps. Therefore, the file data item 6 (bit rate: 12 Mbps) should be selected.

In the above-described embodiment, file data where the entire frame is coded in the intra-image coding mode is searched for data of the error area and the area adjacent thereto, and the data is transmitted to the reception apparatus. Consequently, it becomes possible to decrease the number of frames through which an error propagates. Further, instead of reading data of the entire frame, only data of the error area and the area adjacent thereto is read from the file data coded in the intra-image coding mode, it becomes possible to prevent the code amount from being increased and the code amount from being varied significantly.

Further, when the determination unit 18 determines that the retransmitted data becomes invalid in the reception apparatus, the coding mode of a frame to which data included in the error packet belongs may be determined and processing may be performed based on the determination result as is the case with the first embodiment.

Figure 9:
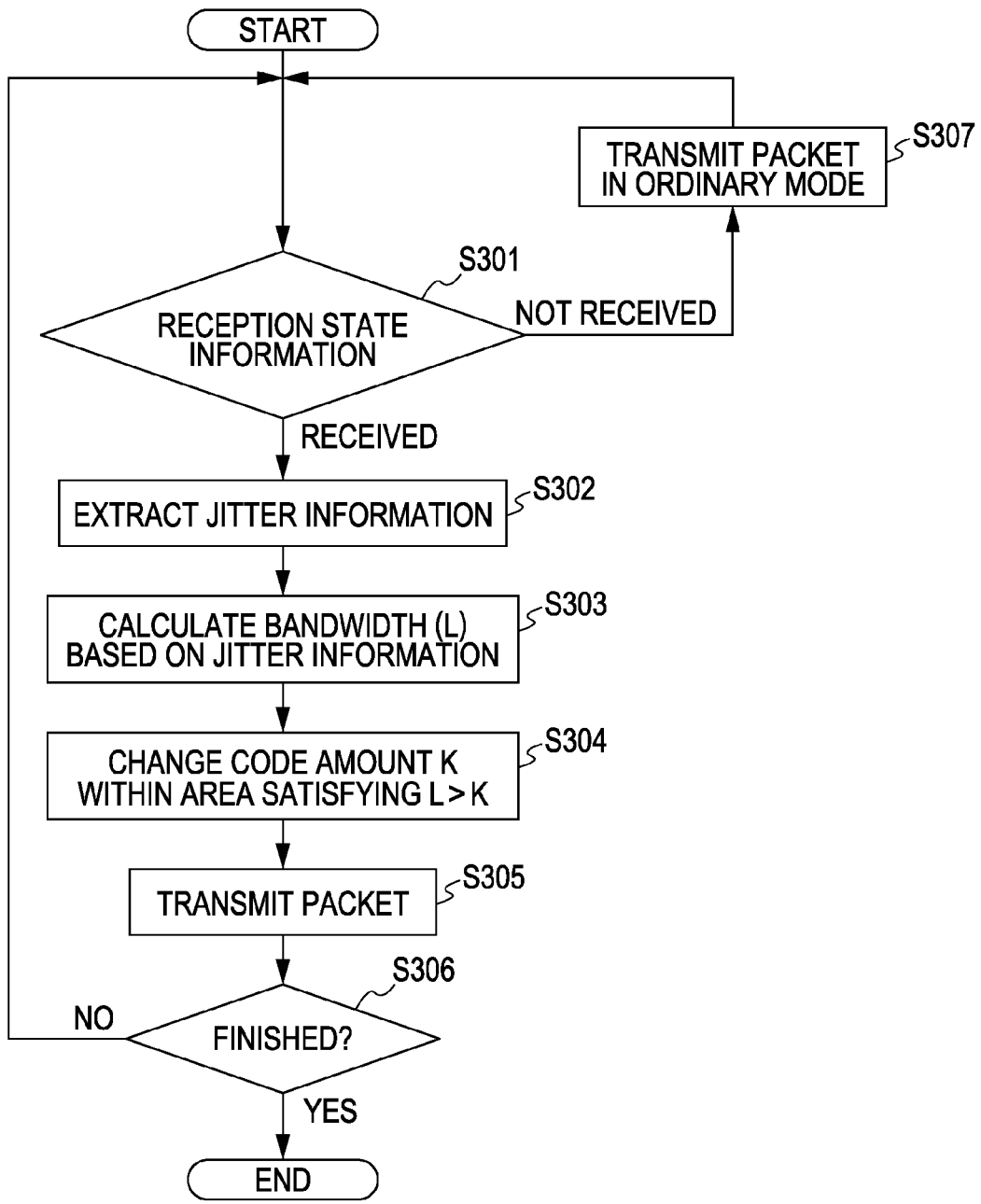
FIG. 9 is a flowchart showing exemplary operations (code amount control) performed by a transmission apparatus according to an embodiment of the present invention.

Next, the code-amount control method performed in the above-described embodiment will be described. As shown in FIG. 9, upon receiving the jitter information included in the reception state information, the code-amount control unit 17 calculates a rate L at which stable communications can be performed based on the packet size, and an average value Jm and a variation range Jb of the packet reception intervals at steps S301, S302, and S303. As a method of calculating the rate L at which the stable communications can be performed, a method shown in Table 1 and Equation (1) can be exemplarily considered.

TABLE 1

| | | Fluctuation range Jb | | | | |
|---|---|---|---|---|---|---|
| | | uu | vv | ww | xx | yy |
| Average Value Jm | aa | α | β | γ | δ | ε |
| | bb | ζ | η | θ | ι | κ |
| | cc | λ | μ | ν | ξ | ο |
| | dd | π | ρ | σ | τ | υ |
| | ee | φ | χ | ψ | ω | Ω |

[Numerical Expression 1]

$$L = C - (A \times D) \quad \text{Equation (1)}$$

C: currently used transmission bit rate
L: rate at which stable communications can be performed
A: arbitrary coefficient
D: jitter information included in reception state information (the average value and the variation range) increase and decrease coefficients of bandwidth, which are derived from Table 1

An increase and decrease coefficient D of the bandwidth is derived by applying the average value Jm and the variation range Jb of the intervals at which packets are received by the reception apparatus to Table 1. For example, if the average value Jm and the variation range Jb of the packet reception intervals are respectively determined to be aa and ww, that is, if the equations Jm=aa and Jb=ww hold, the increase and decrease coefficient D of the bandwidth is indicated by the equation D=γ. A transmission bit rate C is calculated based on the size and the transmission intervals of packets that are currently transmitted from the transmission unit 14. When the transmission bit rate C and the derived increase and decrease coefficient D=$\gamma$ are substituted in Equation (1), the rate L at which the stable communications can be performed is indicated by the equation L=C−(A×$\gamma$).

On the basis of the calculated rate L at which the stable communications can be performed, the code-amount control unit 17 selects a file with a bit rate which does not exceed but closest to the rate L at step S304. Accordingly, the data processing unit 12 reads file data specified by the code-amount control unit 17 from the storage unit 11 and transmits the read file data at step S305. Then, the code-amount control unit 17 uses the coded data of the selected file as transmission data until the next reception state information is transmitted and the value of the calculated rate L is updated. For example, when the rate L is equivalent to 1.5 Mbps while the currently selected file data is the file data item 3 and a bit rate of 3 Mbps is selected, the file data item 2 and a bit rate of 1 Mbps are selected so that the bit rate is smaller than or equal to 1.5 Mbps.

After performing the processing procedures in the above-described manner, it is determined whether the transmission of data relating to the video contents is finished at step S306. If the determination result shows that the data transmission is finished, the operations are finished. Otherwise, the processing returns to step S301.

For operating various devices so as to achieve the functions of the above-described embodiments, program code of software implementing the functions of the above-described embodiments is supplied to a computer (a central processing unit (CPU) and/or a microprocessing unit (MPU)) provided in a system and/or an apparatus connected to the various devices. Then, the functions of the above-described embodiments are achieved by operating the various devices according to the program code stored in the computer of the system and/or the apparatus, which constitutes another embodiment of the present invention.

Further, in that case, the program code itself of the software achieves the functions of the above-described embodiments so that the program code itself constitutes another embodiment of the present invention. Further, a unit and/or a section used to supply the program code to the computer, such as a recording medium storing the above-described program code constitutes another embodiment of the present invention. The recording medium storing the program code may be, for example, a flexible disk, a hard disk, an optical disk, a magneto-optical disk, a compact disk (CD)-read only memory (ROM), a magnetic tape, a nonvolatile memory card, a ROM, etc.

Further, in the case where the functions of the above-described embodiments are achieved by the supplied program code in concert with an operation system and/or other application software or the like running on the computer, the program code constitutes another embodiment of the present invention.

Further, the supplied program code is stored in a memory of a function-expansion board and/or a function-expansion unit relating to the computer, and a CPU or the like provided in the function-expansion board or the like executes part of or the entire actual processing based on instructions of the program code. When the functions of the above-described embodiment are achieved through the processing, another embodiment of the present invention is constituted.

While the present invention has been described with reference to exemplary embodiments, it is to be understood that the technical scope of the invention is not limited to the disclosed exemplary embodiments. Namely, the present invention can be performed in various ways without leaving the technical ideas and/or the main characteristics thereof. The scope of the following claims is to be accorded the broadest interpretation so as to encompass all modifications and equivalent structures and functions.

This application claims the benefit of Japanese Patent Application No. 2008-125132 filed on May 12, 2008, which is hereby incorporated by reference herein in its entirety.

What is claimed is:

1. A transmission apparatus provided to code and transmit video data, the transmission apparatus comprising:
   a memory; and
   a processor coupled to the memory which executes the following:
   transmitting to a receiving apparatus a plurality of frames including a first frame and a second frame which is coded by a forward directional prediction coding mode, and one or more frames being transmitted between the first frame and the second frame;
   receiving a packet including reception state information from a receiving apparatus after the first frame is transmitted by a transmission unit and before the second frame is transmitted by the transmission unit;
   detecting that an error on the first frame is detected by the receiving apparatus, based on the received reception state information;
   identifying, in accordance with the reception state information received from the receiving apparatus, the second frame to be transmitted to the receiving apparatus after the first frame and one or more frames are transmitted;
   specifying, when an error on the first frame is detected by the receiving apparatus, a size of the square part based on a number of frames which are transmitted between a transmission of the first frame and a transmission of the second frame, a position of a center of the square part on the second frame corresponding to a position of a center of the error area on the first frame; and
   coding the square part of the second frame by an intra image coding mode without referring to first video data in the first frame and video data in a frame between the first frame and the second frame, and to code the other part of the second frame by the forward directional prediction coding mode with referring to first video data in the first frame or video data in a frame between the first frame and the second frame; and
   transmitting the coded second frame to the receiving apparatus after the reception state information is received.

2. The transmission apparatus according to claim 1 further comprising:
   a memory configured to store content,
   transmitting coded video data,
   wherein the memory is configured to store a first content containing intra-coded video data coded at a first coding rate and a second content containing intra-coded video data coded at a second coding rate, and
   wherein, for transmitting intra-coded video data, the video data is read from the first content or the second content, and transmitting the read data based on a state of a communication path.

3. A transmission method performed by a transmission apparatus provided to code and transmit video data, the transmission method comprising the steps of:
   transmitting to a receiving apparatus a plurality of frames including a first frame and one or more frames being transmitted between the first frame and a second frame;

receiving a packet including reception state information from a receiving apparatus after the first frame is transmitted by the transmission apparatus and before the second frame is transmitted;

detecting that an error on the first frame is detected by the receiving apparatus, based on the received reception state information;

identifying, in accordance with the reception state information received from the receiving apparatus, the second frame to be transmitted to the receiving apparatus after the first frame and one or more frames are transmitted;

specifying, when it is detected that an error on the first frame is detected by the receiving apparatus, a size of the square part based on a number of frames which are transmitted between a transmission of the first frame and a transmission of the second frame, a position of a center of the square part on the second frame corresponding to a position of a center of the error area on the first frame; and coding the square part of the second frame by an intra image coding mode without referring to first video data in the first frame and video data in a frame between the first frame and the second frame, and to code the other part of the second frame by the forward directional prediction coding mode with referring to first video data in the first frame or video data in a frame between the first frame and the second frame; and transmitting the coded second frame to the receiving apparatus after the reception state information is received.

4. The transmission method according to claim 3, further comprising the steps of:

transmitting coded video data; and storing a first content containing intra-coded video data coded at a first coding rate and a second content containing intra-coded video data coded at a second coding rate, wherein, at the transmitting step, for transmitting intra-coded video data, the video data is read from the first content or the second content, and transmitted based on a state of a communication path.

5. A non-transitory computer readable recording medium storing a program that can be executed by a computer which codes and transmits video data, the program comprising the steps of:

transmitting to a receiving apparatus a plurality of frames including a first frame and a second frame which is coded by a forward directional prediction coding mode, and one or more frames being transmitted between the first frame and the second frame;

receiving a packet including reception state information from a receiving apparatus after the first frame is transmitted by a transmission unit and before the second frame is transmitted;

detecting that an error on the first frame is detected by the receiving apparatus, based on the received reception state information;

identifying, in accordance with the reception state information received from the receiving apparatus, the second frame to be transmitted to the receiving apparatus after the first frame and one or more frames are transmitted;

specifying, when it is detected that an error on the first frame is detected by the receiving apparatus, a size of the square part based on a number of frames which are transmitted between a transmission of the first frame and a transmission of the second frame, a position of a center of the square part on the second frame corresponding to a position of a center of the error area on the first frame; and coding, the square part of the second frame by an intra image coding mode without referring to first video data in the first frame and video data in a frame between the first frame and the second frame, and to code the other part of the second frame by the forward directional prediction coding mode with referring to first video data in the first frame or video data in a frame between the first frame and the second frame; and transmitting the coded second frame to the receiving apparatus after the reception state information is received.

6. The program according to claim 5, further comprising the steps of:

transmitting coded video data; and storing a first content containing intra-coded video data coded at a first coding rate and a second content containing intra-coded video data coded at a second coding rate, wherein, at the transmission step, for transmitting intra-coded video data, the video data is read from the first content or the second content, and transmitted based on a state of a communication path.

7. The transmission apparatus according to claim 1, transmitting coded video data, and determining a coding of the second video data should be performed without referring to the first video data in the first frame and video data that refers to the first video data, when a number of frames to be transmitted between the first frame and a next intra-coded frame is equal to or more than a threshold value.

8. The transmission apparatus according to claim 1, further comprising:

a memory configured to store content, transmitting coded video data, wherein the memory is configured to store the transmitted coded video data, determining whether the first video data in which an error occurs is left in a storage unit, and wherein when the first video data is not left in the memory, the transmission unit transmits video data corresponding to the area specified in the second frame in an intra-coded frame.

9. The transmission apparatus according to claim 1, transmitting coded video data;

determining whether, in a case where the first video data is retransmitted to the receiving apparatus, the retransmitted first video data is handled as effective data in the receiving apparatus; and retransmitting the first video data when determining that processing for the error should be performed and the retransmitted first video data is handled as the effective data, and transmitting third video data which corresponds to the second video data and is coded without referring to the first video data when determining that coding of the second video data should be performed without referring to the first video data in the first frame and video data that refers to the first video data and the retransmitted first video data is not handled as the effective data.

10. The transmission apparatus according to claim 1, transmitting coded video data, determining whether, in a case where the first video data is retransmitted to the receiving apparatus and the retransmitted first video data reaches the receiving apparatus before processing of the first video data is started, the retransmitted first video data is handled by the receiving apparatus as effective data, and retransmitting the first video data when determining that the retransmitted first video data is handled by the receiving apparatus as the effective data, and transmitting third video data which corresponds to the second video data and is coded without referring to the first video data when it is not determined that the retransmitted first video data is handled by the receiving apparatus as the effective data.

11. The transmission method according to claim 3, further comprising the steps of:

transmitting coded video data;

determining whether, in a case that the first video data is retransmitted to the receiving apparatus and the retransmitted first video data reaches the receiving apparatus before processing of the first video data is started on the reception time, the retransmitted first video data is handled by the receiving apparatus as the effective data;

retransmitting the first video data when the determining determines that the retransmitted first video data is handled by the receiving apparatus as the effective data; and transmitting third video data which corresponds to the second video data and is coded without referring to the first video data when the determining does not determine that the retransmitted first video data is handled by the receiving apparatus as the effective data.

12. The program according to claim 5, further comprising the steps of:

transmitting the coded video data;

determining whether, in a case where the first video data is retransmitted to the receiving apparatus and the retransmitted first video data reaches the receiving apparatus before processing of the first video data is started on the reception time, the retransmitted first video data is handled by the receiving apparatus as effective data;

retransmitting the first video data when the determining determines that the retransmitted first video data is handled by the receiving apparatus as the effective data; and transmitting the third video data which corresponds to the second video data and is coded without referring to the first video data when the determining does not determine that the retransmitted first video data is handled by the receiving apparatus as the effective data.

13. A method performed by a system comprising a transmission apparatus connected to a receiving apparatus via a network and the receiving apparatus, comprising:

a first coding step, performed by the transmission apparatus, of coding a first frame;

a first transmitting step, performed by the transmission apparatus, of transmitting the coded first frame to the receiving apparatus;

a first receiving step, performed by the receiving apparatus, of receiving the coded first frame from the transmission apparatus;

a first decoding step, performed by the receiving apparatus, of decoding the coded first frame;

a detecting step, performed by the receiving apparatus, of detecting an error occurred on the first frame;

a second transmitting step, performed by the receiving apparatus, of transmitting a packet including reception state information to the transmission apparatus after the error is detected;

a first outputting step, performed by the receiving apparatus, of outputting the decoded first frame to a display;

a second receiving step, performed by the transmission apparatus, of receiving the reception state information from the receiving apparatus;

an identifying step, performed by the transmission apparatus, of identifying a second frame;

a specifying step, performed by the transmission apparatus, of specifying a size of a square part of the second frame, the size increasing as a number of frames which are transmitted between a transmission of the first frame and a transmission of the second frame increases, a position of a center of the square part on the second frame corresponding to a position of a center of the error area on the first frame;

a second coding step, performed by the transmission apparatus, of coding the square part of the second frame by an intra image coding mode and coding the other part of the second frame by the forward directional prediction coding mode;

a third transmitting step, performed by the transmission apparatus, of transmitting the coded second frame to the receiving apparatus;

a third receiving step, performed by the receiving apparatus, of receiving the coded second frame from the transmission apparatus;

a second decoding step, performed by the receiving apparatus, of decoding the coded second frame; and a second outputting step, performed by the receiving apparatus, of outputting the decoded second frame to the display.

* * * * *